US011112327B2

(12) United States Patent
Cegnar et al.

(10) Patent No.: US 11,112,327 B2
(45) Date of Patent: Sep. 7, 2021

(54) INFLATABLE DEVICE PRESSURE GAUGE APPARATUSES AND METHODS

(71) Applicant: Boonie Labs LLC, Moscow, ID (US)

(72) Inventors: Erik J. Cegnar, Moscow, ID (US); Michael R. Maughan, Troy, ID (US)

(73) Assignee: Boonie Labs LLC, Moscow, ID (US)

( * ) Notice: Subject to any disclaimer, the term of this patent is extended or adjusted under 35 U.S.C. 154(b) by 140 days.

(21) Appl. No.: 16/235,133

(22) Filed: Dec. 28, 2018

(65) Prior Publication Data
US 2019/0204175 A1 Jul. 4, 2019

Related U.S. Application Data

(60) Provisional application No. 62/612,468, filed on Dec. 31, 2017.

(51) Int. Cl.
*G01L 19/06* (2006.01)
*B63B 7/08* (2020.01)
(Continued)

(52) U.S. Cl.
CPC ............ *G01L 19/0645* (2013.01); *B63B 7/08* (2013.01); *B63B 7/085* (2013.01); *B63B 71/00* (2020.01); *G01L 9/0041* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618;
(Continued)

(56) References Cited

U.S. PATENT DOCUMENTS

| 4,478,587 A | 10/1984 | Mackal |
| 5,644,074 A * | 7/1997 | Huang ................... G01B 3/28 |
| | | 116/34 R |

(Continued)

OTHER PUBLICATIONS

Cegnar et al., U.S. Appl. No. 62/612,466, filed Dec. 31, 2017, titled "Attachable Inflatable Craft Pressure Gauge", 14 pages.
(Continued)

*Primary Examiner* — Andre J Allen
(74) *Attorney, Agent, or Firm* — Wells St. John P.S.

(57) ABSTRACT

Inflatable device pressure gauge apparatus and methods are described. According to one aspect, an inflatable device pressure gauge apparatus includes a housing, an attachment mechanism configured to attach the pressure gauge apparatus to an inflatable device which comprises an air chamber which is configured to be inflated to an increased pressure above atmospheric pressure during use of the inflatable device, a pressure sensor coupled with the housing and configured to sense pressurized air from the air chamber of the inflatable device and to output a signal corresponding to an air pressure within the air chamber, a processor configured to process the signal from the pressure sensor and to control generation of a user perceptible emission regarding the air pressure of the air chamber as a result of the processing of the signal, and a power source coupled with the housing and configured to provide electrical energy to the processor.

18 Claims, 11 Drawing Sheets

(51) Int. Cl.
*G01L 9/00* (2006.01)
*B63B 71/00* (2020.01)

(58) Field of Classification Search
CPC . G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; G01L 17/005; G01L 1/16; G01L 1/18; G01L 7/187; G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................... 73/700–756
See application file for complete search history.

(56) References Cited

U.S. PATENT DOCUMENTS

| 5,939,627 | A | * | 8/1999 | Huang | ................ | G01L 17/00 |
| | | | | | | 73/146.8 |
| D422,058 | S | | 3/2000 | Meredith | | |
| D666,933 | S | | 9/2012 | Hoffman et al. | | |
| D728,743 | S | | 5/2015 | Giles | | |
| 2005/0204807 | A1 | * | 9/2005 | Tseng | ................ | G01L 17/00 |
| | | | | | | 73/146 |
| 2005/0252284 | A1 | * | 11/2005 | Wu | ................ | G01L 17/00 |
| | | | | | | 73/146 |
| 2006/0217618 | A1 | | 9/2006 | Lia et al. | | |
| 2007/0068239 | A1 | * | 3/2007 | Chen | ................ | G01L 17/00 |
| | | | | | | 73/146.5 |
| 2017/0080761 | A1 | * | 3/2017 | King | ................ | B60C 23/003 |
| 2017/0087944 | A1 | * | 3/2017 | King | ................ | B60C 23/003 |
| 2017/0113498 | A1 | * | 4/2017 | King | ................ | B60C 23/002 |

OTHER PUBLICATIONS

Leafield Marine, "D7 Installation and Service Instructions", available online at https://www.leafieldmarine.co.uk/Portals/0/Documents/D7-Installation-and-Service-Instructions.pdf, Oct. 26, 2016, United Kingdom, 5 pages.

Maughan et al., U.S. Appl. No. 29/643,695, filed Apr. 11, 2016, titled "Attachable Inflatable Craft Pressure Gauge", 6 pages.

* cited by examiner

INFLATABLE DEVICE PRESSURE GAUGE APPARATUSES AND METHODS

RELATED PATENT DATA

This application claims the benefit of U.S. Provisional Patent Application Ser. No. 62/612,468, filed Dec. 31, 2017, titled "Attachable Inflatable Craft Pressure Gauge", the disclosure of which is incorporated herein by reference.

TECHNICAL FIELD

This disclosure relates to inflatable device pressure gauge apparatuses and methods.

BACKGROUND OF THE DISCLOSURE

Numerous types of inflatable watercraft are used on bodies of water. To achieve safe and optimal performance of the inflatable watercraft, it is important if not critical to inflate these craft to the correct inflation pressure. There are a number of common ways to arrive at the correct inflation pressure. One is to measure the pressure during pumping by using an inline pressure gauge or alternating between pumping for periods of time and measuring the inflation pressure. If the correct inflation pressure is not achieved, additional pumping is required.

If a craft is underinflated, it may not perform well. However, an overinflated craft is at risk of bursting from internal air pressure. Therefore it takes the effort of measurement during inflation to arrive at the correct pressure. To complicate matters the internal pressure of the craft can vary from temperature and altitude changes during use. In certain instances a craft which is initially inflated properly, can reach pressures beyond the safe allowable pressure after heating up in the sun. If this pressure is not released in time, the craft can rupture from too much pressure rendering it unusable.

Because the operator may be unaware of the state of the pressure of their device, it could either be underinflated, producing suboptimal performance, or overinflated putting it at risk of bursting. Some aspects of the present disclosure pertain to apparatuses and methods which provide information regarding the pressure of an air chamber of an inflatable device to the operator thereby providing valuable information to the operator during use. For example, some of the disclosed arrangements display pressure information regarding the inflatable device and/or generate alarms if the air pressure is reaching unsafe levels. Additional apparatus and method aspects are described in the illustrative embodiments below.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

The following description and the referenced drawings disclose example embodiments of an inflatable device pressure gauge apparatus and associated methods of monitoring air pressures within an air chamber of an inflatable device. The embodiments discussed herein are merely examples in nature and are not intended to limit the scope of the claims in any manner. Rather, the description and drawings describe various example embodiments of the claimed subject matter.

The use of "e.g.," "etc.," "for instance," "in example," "or" and grammatically related terms indicates non-exclusive alternatives without limitation unless otherwise noted. The use of "including" and grammatically related terms means "including, but not limited to," unless otherwise noted. The use of the articles "a," "an" and "the" are meant to be interpreted as referring to the singular as well as the plural, unless the context clearly dictates otherwise.

As described below, some example embodiments of the disclosure provide a pressure gauge apparatus that attaches directly to a valve body port of an associated inflatable device, such an inflatable watercraft or vessel, for the purpose of monitoring the air pressure of an air chamber of the associated inflatable device. Inflatable devices include watercraft or vessels which are inflated by air to create a semi-rigid mechanical structure which is buoyant in and intended to navigate water. Examples of inflatable watercraft include but are not limited to rafts, kayaks, canoes, stand up paddleboards, catarafts, float tubes, powered boats, and towable craft. Some watercraft are constructed of a flexible plastic material such as PVC (poly vinyl chloride) or PU (polyurethane) which form walls and define the air chamber of the watercraft, and the watercraft are inflated to an inflation pressure recommended by the manufacturer for optimal performance.

In one embodiment, the pressure gauge apparatus protects a valve assembly of an air chamber of the associated inflatable device being monitored during use and provides an additional mechanism of sealing the valve against air egress from the air chamber. Some embodiments of the disclosure provide pressure gauges which measure the pressure inside of the air chamber of the device to which it is affixed and displays it on the front of the apparatus for observation by a user during use. In one embodiment, the pressure gauge apparatus generates an audible and/or visible alarm to alert the user in the case that the internal chamber pressure exceeds or falls below a desired range of pressures. Other embodiments are described herein.

Figure 1:
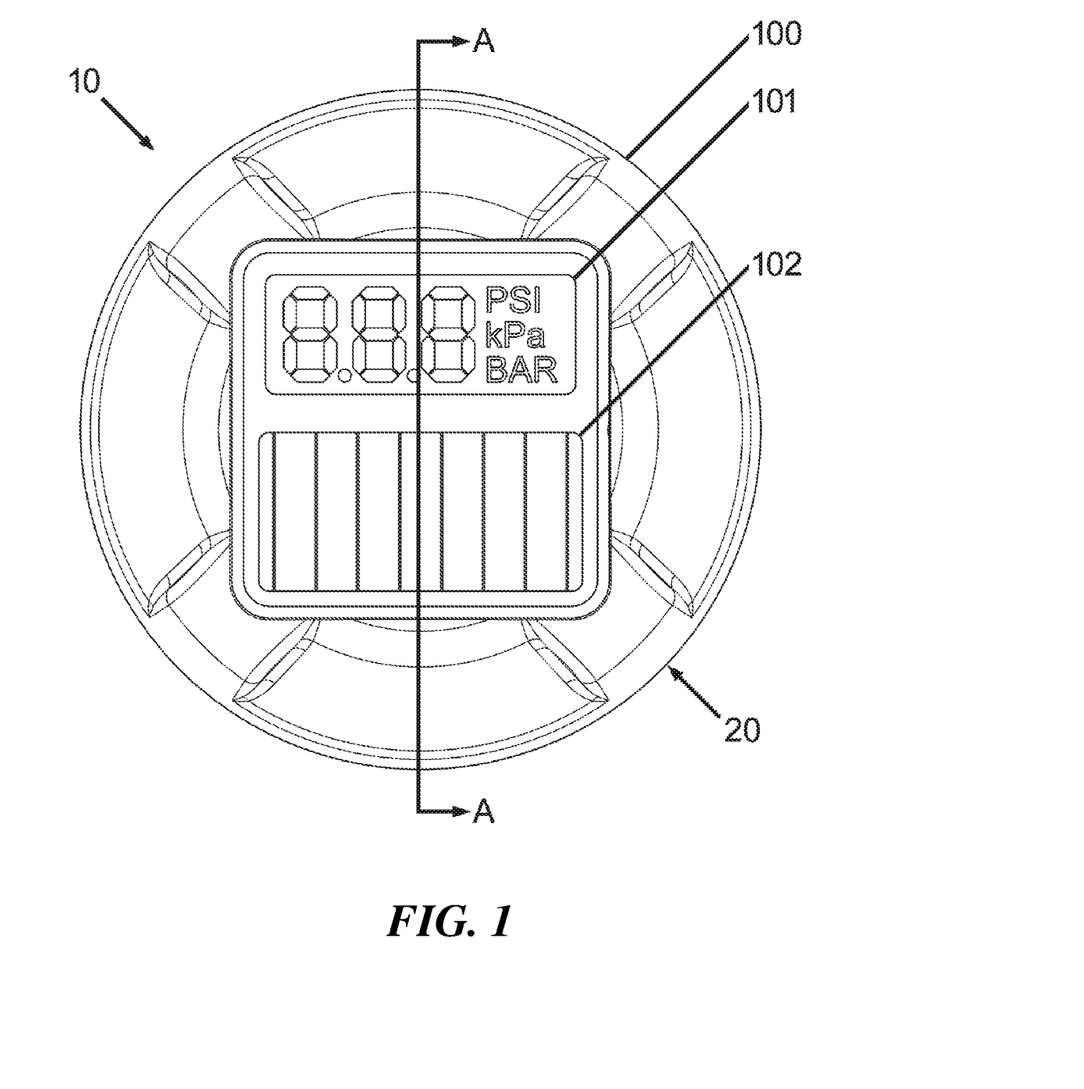
FIG. 1 is a top view of an inflatable device pressure gauge apparatus according to one embodiment.

Referring to FIG. 1, an example embodiment of an inflatable device pressure gauge apparatus 10 is shown. Some of the example embodiments herein are described with respect to use of apparatus 10 to monitor internal air pressures of an air chamber of an associated inflatable device, such as an inflatable watercraft (not shown in FIG. 1).

In the illustrated embodiment of FIG. 1, pressure gauge apparatus 10 includes a housing 20, a display 101 and a solar panel 102. The depicted pressure gauge apparatus 10 is additionally configured to display the air pressure of the internal air chamber of the watercraft. As discussed below, housing 20 is configured in some embodiments to define a watertight internal volume wherein various components and circuitry of the apparatus 10 are housed and protected from the environment in which the apparatus 10 is used.

Devices being monitored include one or more inflatable air chambers which are inflated with pressurized air for use. An air chamber includes a valve assembly (not shown in FIG. 1) which permits inflation and deflation of the air chamber of the device and the valve assembly is configured to prevent egress of pressurized air from the air chamber during use of the device. In the illustrated embodiment of FIG. 1, inflatable device pressure gauge apparatus 10 is implemented as a valve cap that is configured to be attached to a valve port body of the valve assembly of the inflatable device to protect the port and provide additional sealing of the air chamber of the device in addition to the pressure monitoring operations discussed below.

Display 101 is configured to depict visually perceivable information for observation by a user. In one embodiment, a processor is configured to control the display 101 to emit the user perceptible information in the form of graphical information regarding the air pressure of the air chamber being monitored. Display 101 is implemented as an LCD screen in one example.

In one embodiment, solar panel 102 is part of a power source described further below which is configured to generate and/or store electrical energy. Example solar panels include semiconductor devices which convert light from any light source such as the sun or a battery powered light into electrical power. The panel 102 may contain a single cell or multiple cells electrically configured in parallel, series, or combinations thereof to form the entire panel. Example power sources may also include a battery, a capacitor, or combinations thereof, and solar panel 102 may be omitted in some implementations of the power source.

Figure 2:
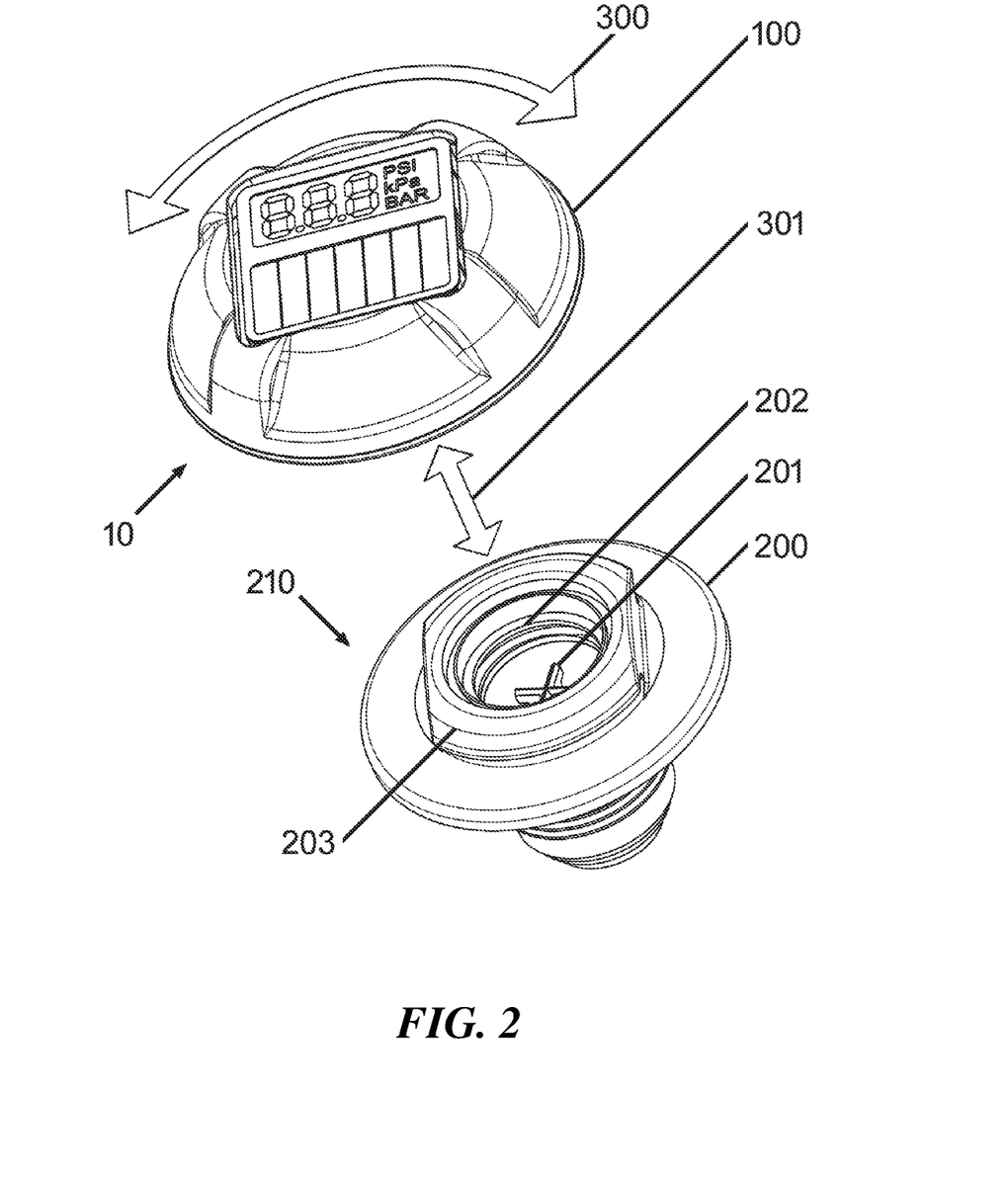
FIG. 2 is a partially exploded view demonstrating attachment of an inflatable device pressure gauge apparatus to a valve port body of an associated inflatable device to be monitored.

Referring to FIG. 2, attachment of the pressure gauge apparatus 10 implemented as a valve cap in the illustrated embodiment to a valve assembly 210 of an inflatable device is shown. In FIG. 2, pressure gauge apparatus 10 is located in atmospheric air and the valve assembly controls the flow of air with respect to the air chamber. The pressure gauge apparatus 10 is attached to the inflatable device by moving the pressure gauge 10 along a coaxial direction 301 towards valve assembly 210 of the inflatable device which is used to control the flow of air with respect to the air chamber for inflation/deflation of the associated air chamber.

The example illustrated valve assembly 210 includes a valve port body 200 and a poppet 201. The valve port body 200 is located at a wall (not shown) of the air chamber of the inflatable device and selectively permits air to flow into or out of the air chamber with respect to atmosphere, a pump or other device external of the air chamber. In one embodiment, the valve assembly 200 is a one-way valve wherein air can flow one direction (typically inwardly) but is prevented from flowing the other direction (typically outwardly). A valve of this form typically uses a spring to make it tend towards closed but which may be opened by manual operation of the poppet 201 with respect to the valve port body 200. Poppet 201 generally takes the shape of a 'mushroom' and which can be opened manually by pushing it and locked by turning it to engage structural features which prevent it from closing during inflation or deflation of the air chamber of the associated inflatable device.

The valve port body 200 includes threads 202 and a flange 203 in the illustrated embodiment. The threads 202 of the valve port body 200 mate or interface with threads 129 (shown in FIG. 5) of the pressure gauge apparatus 10. The pressure gauge apparatus 10 is rotated 300 one direction to removably attach or affix the apparatus 10 to the valve port body 200 and the inflatable device or the opposite direction to un-affix the apparatus 10 from the valve port body 200 and the inflatable device. A portion of valve port poppet 201 is visible in FIG. 2.

Figure 5:
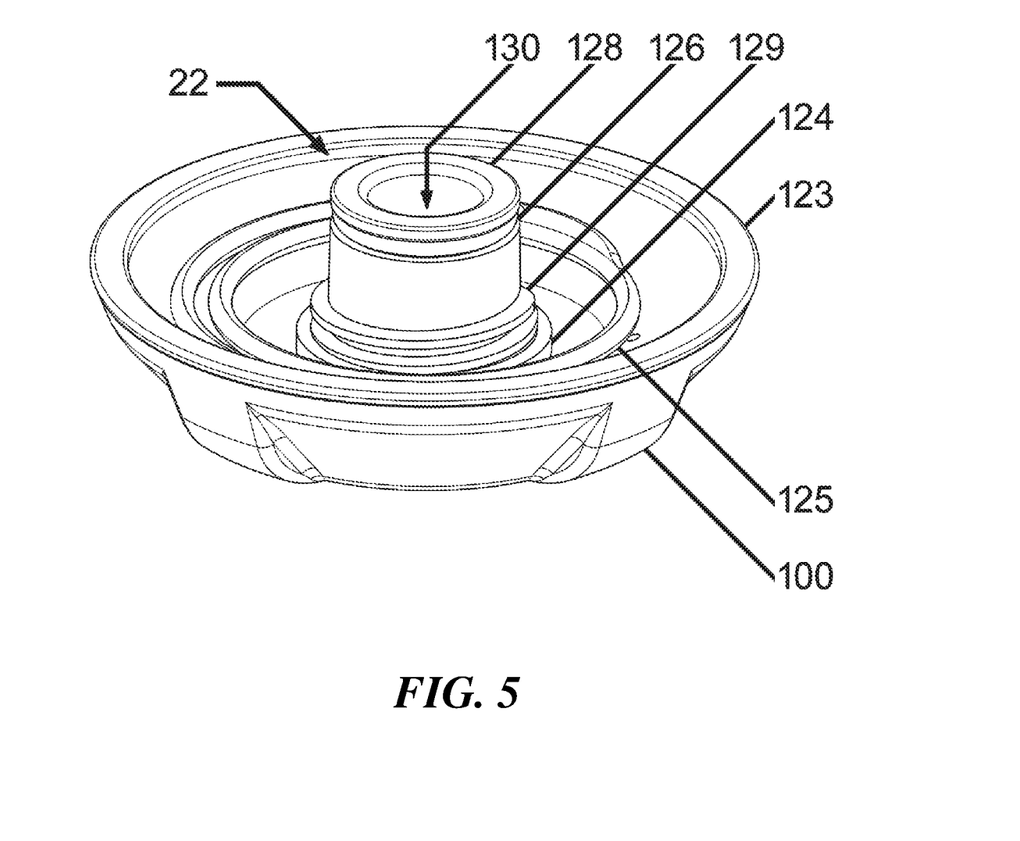
FIG. 5 is bottom-down perspective view showing threads of an inflatable device pressure gauge apparatus which interface with a valve port body of an associated inflatable device to be monitored and an example tether configured to be attached to the valve port body.

The extended portion 22 including threads 129 may be referred to as an attachment mechanism which is configured to removably attach or affix the pressure gauge apparatus to the valve port body 200 of the inflatable device during use of apparatus 10 to monitor the pressure of the air chamber of the inflatable device.

Figure 3:
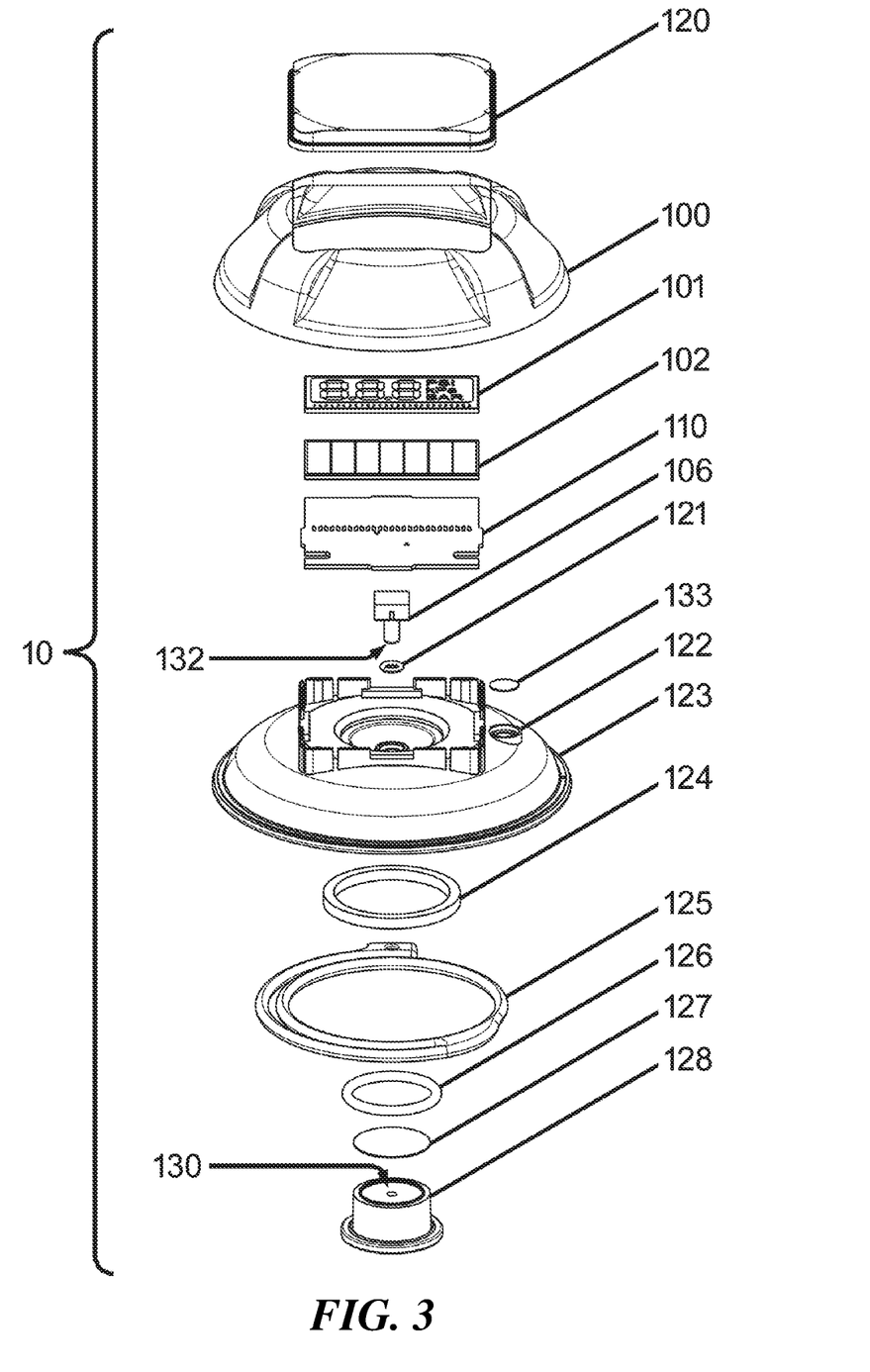
FIG. 3 is a perspective exploded view showing housing elements and internal functional elements of one embodiment of an inflatable device pressure gauge apparatus.
Figure 4:
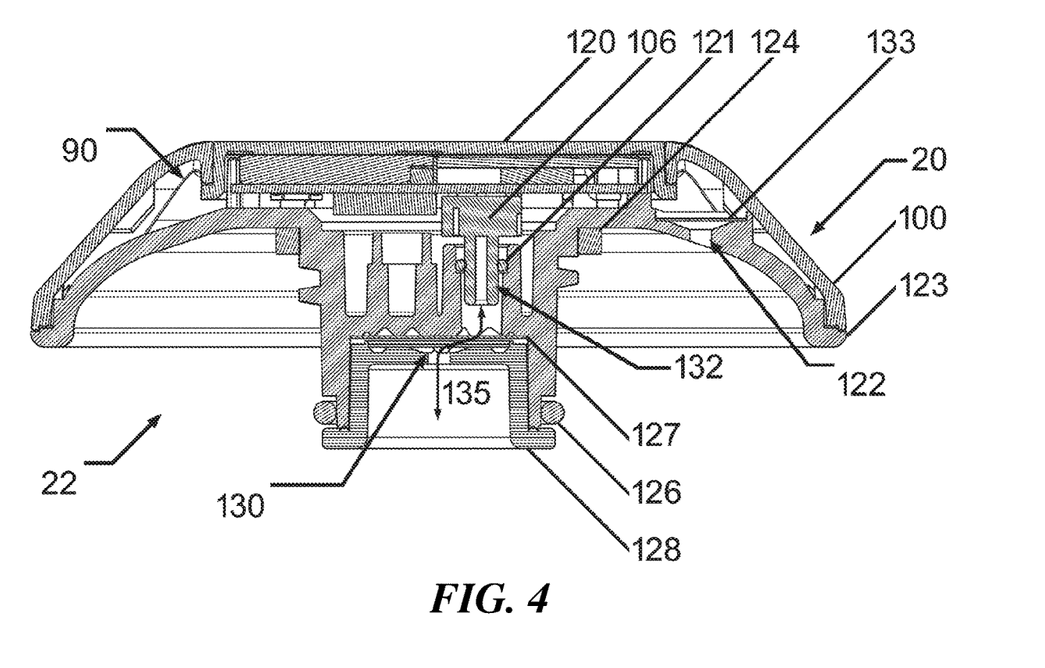
FIG. 4 is a cross-sectional view of the inflatable device pressure gauge apparatus taken along line A-A of FIG. 1.

Referring to FIGS. 3-5, additional details regarding the pressure gauge apparatus 10 are shown according to an example embodiment. Housing 20 includes a housing top 100, housing bottom 123, lens 120, an insert 128 and a semipermeable membrane 127 in the illustrated embodiment.

Housing top 100 is attached to a housing bottom 123 to form housing 20 and which defines an internal volume 90 which includes a display 101, solar panel 102, and a PCB circuit board 110 and which protects the electronic components against water and debris ingress. The housing top and bottom 100, 123 are assembled along with lens 120, membrane 127 and insert 128 in a manner which seals the parts together and does not allow water or other debris to enter into the housing 20. In one embodiment, ultrasonic welding is utilized to seal the housing top and bottom 100, 123, lens 120 and the insert 128 together. The lower portion of housing bottom 123 and insert 128 form an extended portion 22 of the housing 20.

Pressure gauge apparatus 10 further includes a main seal member 124 and a make-before-break seal member 126. During attachment of the pressure gauge apparatus 10 to valve port body 200, extended portion 22 of the pressure gauge housing 20 is inserted into valve port body 200 and make-before-break seal member 126 initially engages with an interior surface of the valve port body 200 to create a seal. Thereafter, as the apparatus 10 is rotated 300, the valve port body 200 and apparatus 10 come closer together in the axial direction 301.

In one embodiment, the extended portion 22 is configured to provide the valve assembly 210 in an open configuration upon insertion of portion 22 into the valve port body 200. As the parts come closer together, the extended portion 22 pushes on the valve port poppet 201 which opens the valve assembly 210 and permits the flow of air with respect to the air chamber of the inflatable device. Because the make-before-break seal member 126 has previously engaged the valve port body 200, the pressurized air in the air chamber corresponding to the valve port cannot escape. Furthermore, the main seal member 124 contacts a flange 203 of the valve port body 200 forming a second seal between the apparatus 10 and the valve assembly 210 upon further rotation of the apparatus 10.

Accordingly, seal member 126 is configured to form a seal with the valve port body 200 during insertion of extended portion 22 into valve port body 200 and prior to provision of the valve assembly in the open configuration in one embodiment. In addition, the seal member 126 is configured to form a first seal with the valve port body 200 prior to the formation of a second seal by second seal member 124 with the valve port body 200 during the insertion of the extended portion 22 into the valve port body 200 as described above.

Once the pressure gauge apparatus 10 is fully tightened and affixed to the valve port body 200, the primary seal member 124 and the make-before-break seal member 126 are compressed creating pressure at the interfaces of the seal members 124, 126 with the valve port body 200 which prevents pressurized air from escaping from the air chamber of the associated inflatable device to be monitored.

The housing 20 defines an air passage 135 which also allows air pressure communication from the air chamber and orifice 130 to an inlet port 132 of the pressure sensor 106. A seal 121 prevents air from escaping from air passage 135 into internal volume 90 of the housing 20.

When the pressure gauge apparatus 10 is fully tightened with respect to the valve assembly 210, the valve port poppet 201 is open which allows air pressure to flow via an orifice 130 and air passage 135 through insert 128 which operates as a pressure-side vent for sensing air pressures within the air chamber. In one embodiment, the air passage 135 flows through a semipermeable membrane 127 which is configured to resist the flow of water and other debris through air passage 135 into the interior of pressure gauge apparatus 10 while permitting the flow of air molecules therethrough. The semipermeable membrane 127 may be omitted in some embodiments.

The housing 20 additionally includes an atmospheric orifice 122 which allows pressure equalization between the outside atmosphere and the internal volume 90 defined by housing top and bottom 100, 123, lens 120 and insert 128. An atmospheric port of the pressure sensor 106 is exposed to atmospheric pressure within the internal volume 90 of the housing 20 in one embodiment. A semipermeable membrane 133 may also cover the orifice 122 and prevent water and debris from entering the internal volume 90 of the housing 20 while permitting air flow therethrough. Accordingly, membranes 127, 133 provide pressure equalization at opposing sides of the individual membranes 127, 133. The membranes 127, 133 are assembled to other portions of the housing 20 by heat-staking in one embodiment.

The apparatus also includes a flexible (e.g., plastic) tether 125 which may be coupled with the valve body port 200 of the inflatable device being monitored so the apparatus 10 does not enter the water if accidentally dropped by the user while the apparatus 10 is not attached to the valve port body 200.

Figure 6:
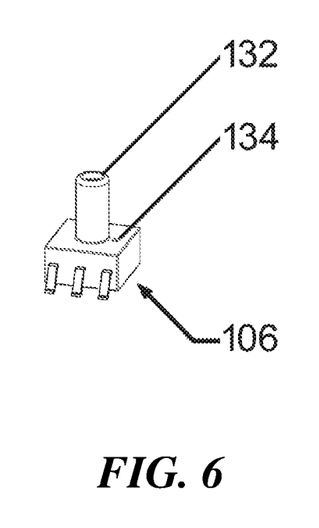
FIG. 6 is an illustrative representation of a pressure sensor according to one embodiment.

Referring to FIG. 6, one embodiment of a pressure sensor 106 is shown. Pressure sensor 106 is configured to sense pressurized air from the air chamber of the inflatable device being monitored and to output one or more electrical signals corresponding to the air pressure of the air chamber. In one specific example embodiment, pressure sensor 106 is additionally configured to sense atmospheric air pressure of the environment in which the apparatus 10 is being used.

In the depicted embodiment, pressure sensor 106 includes an inlet port 132 for fluid communication with and sensing air pressure within the air chamber of the inflatable device and an atmospheric port 134 for fluid communication with the internal volume of the housing 20 and sensing atmospheric pressure. Accordingly, following installation of the pressure gauge apparatus 10 to an associated inflatable device to be monitored, port 132 of the pressure sensor 106 is in fluid communication with the internal air chamber of the inflatable device and port 134 is in fluid communication with the internal volume defined by housing 20. In one embodiment, pressure sensor 106 is configured to monitor the pressures at both ports 132, 134 to implement differential pressure monitoring and generate and output an electrical signal as a result of the differential pressure monitoring which is indicative of the air pressure within the air chamber of the associated inflatable device.

In the described embodiment, the pressure sensor 106 converts air pressure sensed on its inlet ports 132, 134 into respective signals which are proportional to the sensed air pressure. In one embodiment, pressure sensor 106 is a microelectromechanical system (MEMS) sensor which reacts to a pressure at the inlet port 132 relative to the atmospheric pressure which surrounds the body of the pressure sensor and is sensed by atmospheric port 134.

Accordingly, in one embodiment, differential pressure sensing is implemented using the different pressures sensed at ports 132, 134 which compares the air pressures of the air chamber of the inflatable device with respect to the atmospheric pressure to provide information regarding the air pressure within the air chamber. The use of differential pressure sensing by pressure gauge apparatus 10 allows the device to accurately determine the air pressure within the air chamber of the inflatable device being monitored even if the inflatable device is used at different altitudes and/or temperatures since the atmospheric pressure is being monitored as well as the pressure within the air chamber itself.

Figure 7:
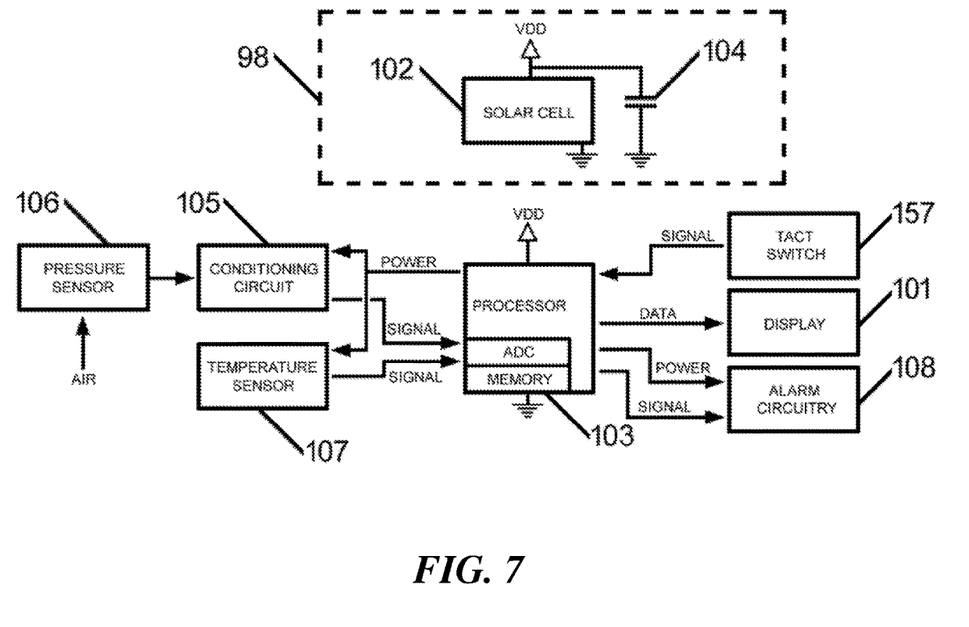
FIG. 7 is a block diagram of an example embodiment of the electronic system of an inflatable device pressure gauge apparatus.

Referring to FIG. 7, additional circuitry of an electrical system of the apparatus 10 is shown according to one example implementation. In one embodiment, the sensor 106 employs a Wheatstone bridge which is energized with an electrical current and the voltage of a signal at the output terminals of the bridge varies in proportion to the pressure sensed at the inlet port 132 relative to the pressure sensed at the atmospheric port 134. The sensor 106 implements differential pressure sensing where the signal generated by the sensor 106 is determined by subtracting the atmospheric pressure sensed at port 134 from the pressure of the air chamber sensed at port 132.

The output signal of the sensor 106 is modified by a conditioning circuit 105 which amplifies the signal and provides filtering in the frequency domain. Circuit 105 may be contained within the sensor itself or implemented as part of an external circuit in example embodiments.

The amplified and filtered signal is fed into a processor 103 which converts the signal into a digital representation through use of an analog-to-digital converter. Processor 103 is configured to process the digitized signal(s) from sensor 106 and to control the generation and outputting of one or more user perceptible emissions regarding air pressure of the air chamber as a result of the processing of the signal(s). For example, processor 103 controls the generation and outputting of user perceptible emissions by controlling display 101 to visually depict numerical values of the air pressure of the air chamber and/or controlling alarm circuitry 108 to emit visual/and or audible alarm signals.

The processor 103 may take the form of a microprocessor, a microcontroller, a DSP (digital signal processor), an FPGA (field programmable gate array), a logic circuit, or an analog processor. The processor 103 operates on the digital representation of the pressure value to convert the value into standard units such as: PSI, BAR, kPa, and kg/cm$^2$. The processor 103 controls the display 101 in order to depict the value of the pressure to be readable by a user.

In one embodiment, a temperature sensor 107 is utilized to convert the temperature of the PCB circuit board 110 to an electrical signal which is read by the processor 103 and converted into a digital representation through use of an analog-to-digital converter. Other embodiments employ a serial bus such as SPI or i2C where the signal from the sensor to the processor 103 is already in a digital format.

In one embodiment, the processor 103 calls upon values stored in internal non-volatile memory which represent calibration constants and temperature coefficients. The processor 103 mathematically combines these stored values with the temperature reading and utilizes them to adjust the value of the pressure of the air chamber of the inflatable device and to increase the accuracy of its reading.

In one embodiment, the processor 103 conditionally checks the pressure reading of the air chamber of the inflatable device and controls generation of an audible and/or visual alarm signal via alarm circuitry 108 if the pressure is below or above respective high/low pressure thresholds which may be programmed by the user depending upon the type of inflatable device being monitored and stored within memory of the apparatus 10. In one embodiment, a pressure of greater than 2.5 PSI will result in the generation of an alarm to alert the user of excessive pressure (e.g., where a maximum inflation pressure of the inflatable device is 2.5 PSI). In some embodiments, an audible and/or visual alarm is generated to alert the user if the pressure is too high or too low as defined by the high/low thresholds.

In one embodiment, the circuitry of the apparatus 10 receives electrical energy from a suitable power source 98 which may include a solar panel 102 as described above. The circuitry utilizes this electrical energy in order to perform the required tasks.

The processor 103 controls the power to various sub-circuits such as the pressure sensor 106, the conditioning circuit 105, the temperature sensor 107, the alarm circuitry 108, and the display 101. This control allows the various sub-circuits to consume power from the power source 98 periodically and at the discretion of the control process being implemented. In one embodiment, the display 101 may be updated at a rate of 30 times per second and the sensor 106 may be sampled once every several seconds. During the time that the processor 103 does not need to be active, it enters a sleep mode to significantly reduce power consumption. The management of processor sleep mode and periodically powering sub-circuits reduces the overall circuit power consumption.

Because the operation of the various sub-circuits is periodic in nature in one embodiment, the overall current consumption of the system is periodic in nature. In one embodiment, the power source 98 additionally employs a bulk capacitor 104 such as a multilayer ceramic capacitor in order to buffer the non-constant current consumption. Other embodiments of power source 98 employ other electrical energy storage devices, such as a conventional battery, a solid-state battery and/or an electric double layer capacitor.

Figure 8:
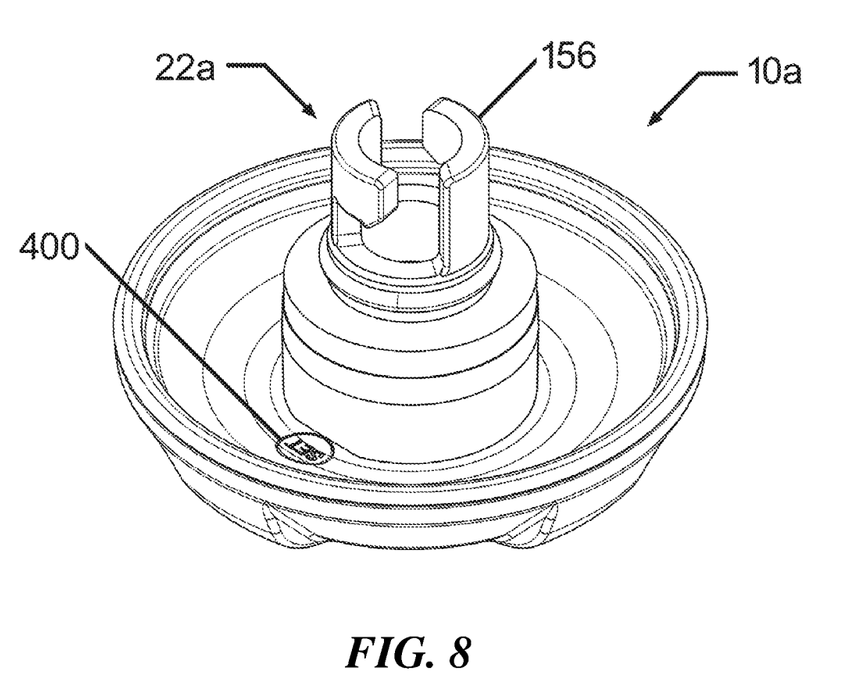
FIG. 8 is bottom-down perspective view showing an inflatable device pressure gauge apparatus according to one embodiment including a locking attachment mechanism for attachment of the apparatus to a valve port body of an inflatable device to be monitored.

Referring to FIG. 8, the illustrated inflatable device pressure gauge apparatus 10a includes an attachment mechanism in the form of a lock member 156 configured to permit attachment and locking of apparatus 10 to a valve port body having a corresponding lock member (not shown). In particular, extended housing portion 22a is in the form of a half-turn lock member 156 which may be inserted into or otherwise mate with a corresponding lock member of a valve port body of an inflatable device to be monitored and turned to removably attach or lock the apparatus 10a with respect to the associated inflatable device being monitored. The insertion of the extended housing portion 22a into the valve port body also operates to open a poppet and permit the apparatus 10a to sense the air pressure of the air chamber of the associated inflatable device being monitored. Accordingly, in one embodiment, the housing of apparatus 10 is configured to provide the valve assembly 210 in an open configuration during attachment of the pressure gauge apparatus 10 to the valve assembly 210 to selectively permit the flow of the pressurized air from the air chamber during sensing of the pressurized air by the pressure sensor. A button assembly 400 is also provided as discussed further below.

Figure 9:
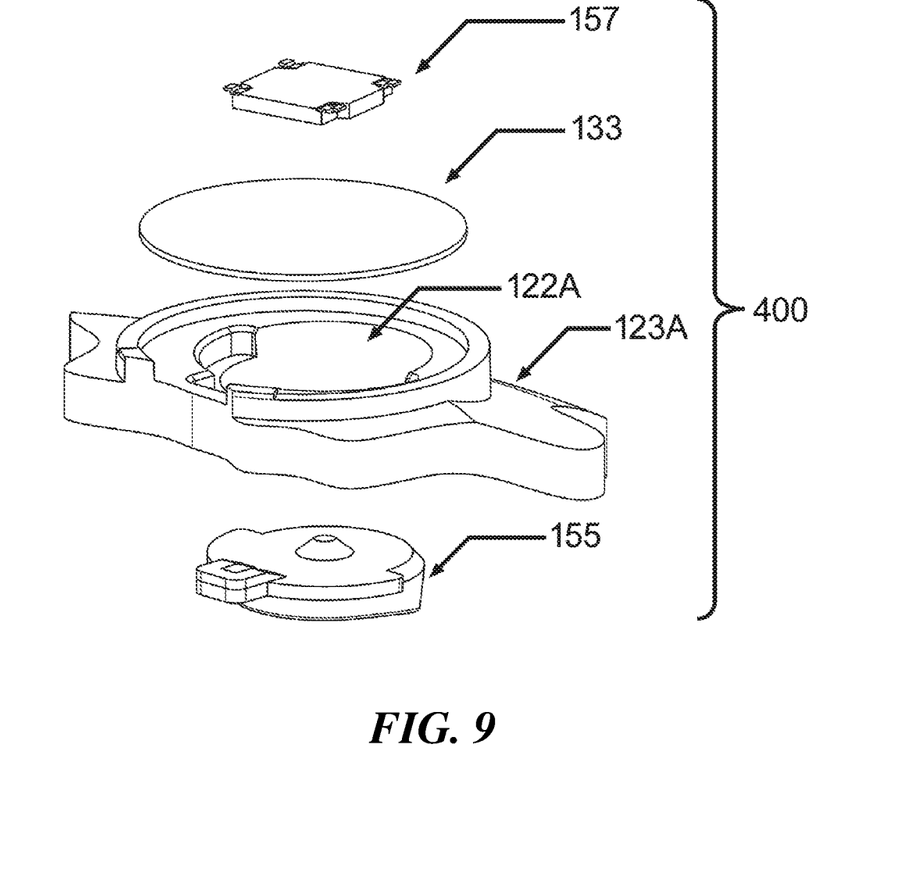
FIG. 9 is a partially exploded view of a button assembly of an inflatable device pressure gauge apparatus according to one embodiment.

Referring to FIG. 9, one embodiment of button assembly 400 is shown which maintains a watertight seal about the internal volume 90 while allowing mechanical communication to the electronics within volume 90. The illustrated button assembly 400 may be used in place of orifice 122 and membrane 133 shown in FIG. 3 to permit the user to provide inputs to the processor 103 of apparatus 10 while additionally maintaining a watertight internal volume 90.

In the illustrated embodiment, the button assembly 400 includes a semipermeable membrane 122a and a plastic button 155 and a tact switch 157 adjacent to opposing surfaces of the membrane 122a. The housing bottom 123a defines orifice 122a and includes surrounding structure which is configured to receive and maintain button 155 in positional relationship with respect to orifice 122a.

In addition, translation movement of button 155 is permitted towards membrane 133 upon being depressed by a user and which flexes to contact switch 157 and provide switch 157 in a temporarily closed position. For example, the user may depress button 155 which causes membrane 133 to deflect inwardly towards thereby changing a state of the switch 157 to a closed position. When the user removes their finger from button 155, the membrane 133 returns to its initial neutral position changing the switch 157 to the open position.

Processor 103 is configured to receive signals from switch 157 which correspond to user depressions of button 155, and take appropriate action for example to change units of pressure depicted on display 101, adjust high/low alarm thresholds, or control other desired operations of apparatus 10. Furthermore, the use of semipermeable membrane 133 maintains a watertight internal volume of the apparatus 10.

Figure 10:
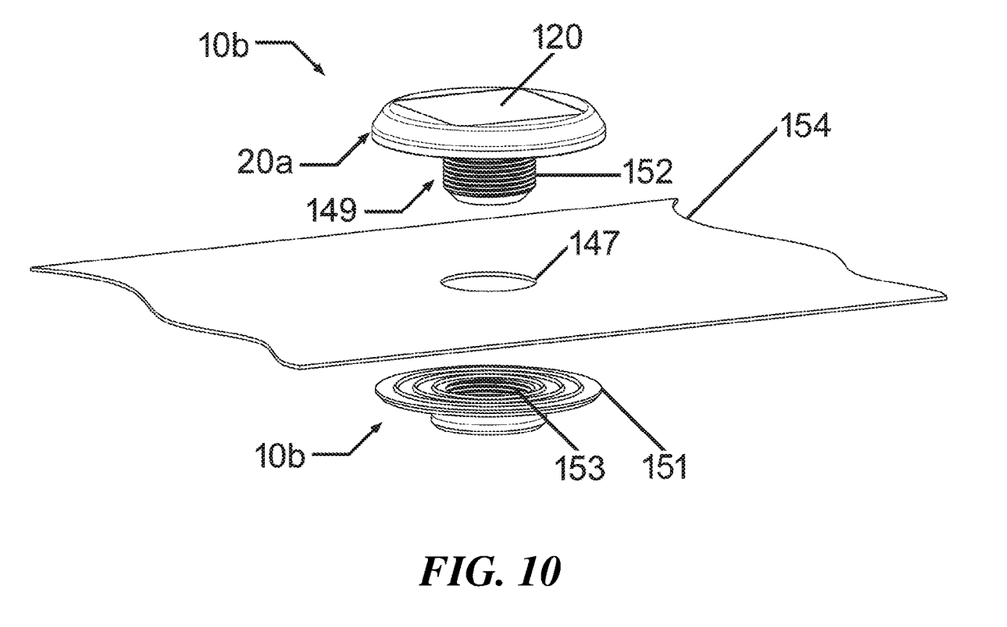
FIG. 10 is a partially exploded view demonstrating an attachment process of an inflatable device pressure gauge apparatus directly to a wall of an inflatable device to be monitored according to one embodiment.

Referring to FIG. 10, another embodiment of the pressure gauge apparatus 10b is shown. The depicted pressure gauge apparatus 10b does not attach to a valve port, but instead is configured to be attached or affixed directly to body or wall material 154 of the inflatable air chamber of the inflatable device via an attachment mechanism including an extension 149 from the bottom of housing 20a and a corresponding insert nut 151. In the depicted embodiment, bottom extension 149 is configured to pass through an orifice 147 in a wall or body material 154 of inflatable device. Extension 149 includes threads 152 which mate or interface with the threads 153 of insert nut 151 of the apparatus 10b. The nut 151 screws onto the threads 152 of the bottom extension 149 and "sandwiches" the apparatus 10b about opposing surfaces of wall 154 to secure the apparatus 10b to the inflatable device, form an airtight seal with respect to wall 154 of the inflatable device and permit the apparatus 10 to monitor internal pressures of the air chamber. In one embodiment, the attachment of the nut 151 to the bottom extension 149 constrains the material which makes up the outside body of the inflatable device between the portion of housing 20a including the bottom extension 149 and nut 51.

Figure 11:
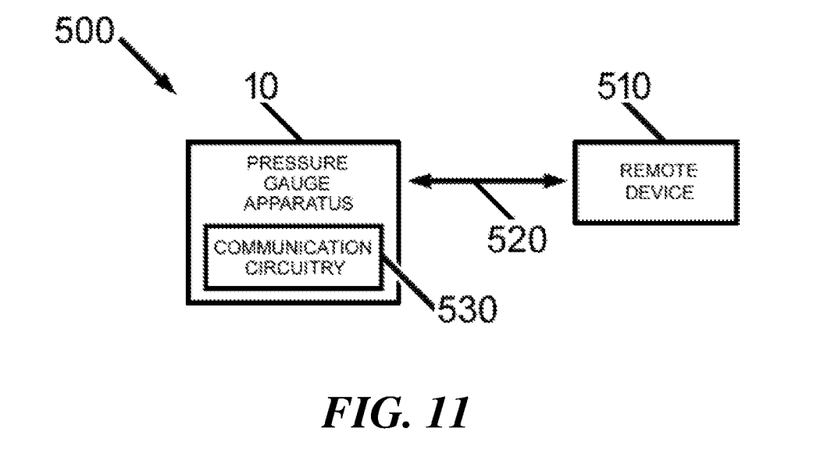
FIG. 11 is a functional block diagram of a pressure monitoring system according to one embodiment.

Referring to FIG. 11, a pressure monitoring system 500 including pressure gauge apparatus 10 and a remote device 510 is shown according to one embodiment. Pressure gauge apparatus 10 is configured to communicate with a remote device 510 via an appropriate communications link 520 to enable pressure monitoring and alarm capabilities at locations remote from the apparatus 10 which may be affixed to the air chamber of the associated inflatable device being monitored in some implementations.

In one embodiment, the communications link 520 is a wired or wireless connection between apparatus 10 and remote device 510. Apparatus 10 is configured to output information regarding air pressures being monitored and associated alarms. Remote device 510 may include a display device and/or audible/visual alarm indicator similar to apparatus 10 which are configured to output user perceptible emissions regarding the monitored air pressures of the air chamber of the inflatable device in the form of graphical display of the monitored air pressures and/or alarms regarding the monitored air pressures exceeding a threshold.

In example embodiments, remote device 510 may be further implemented with communications circuitry, a processor, display, and/or speaker to receive and process data communications regarding air pressure from apparatus 10 and control the generation of user perceptible emissions from remote device 510 at physical locations remote from apparatus 10 during real time monitoring of the air pressures of the air chamber by apparatus 10.

In a more specific embodiment, remote device 510 may be implemented as a cellular smart phone which is proximately located with respect to a user or operator of the inflatable device. In another embodiment, remote device 510 may be mounted at a dashboard or at another location proximate to controls of the inflatable device being monitored. In some embodiments, a plurality of apparatuses 10 may simultaneously monitor a plurality of respective air chambers of an inflatable device or watercraft and output information regarding the monitored air chambers to the remote device 510 which enables the user to simultaneously monitor multiple air chambers at the physical location of the remote device 510.

Pressure gauge apparatus 10 may include communication circuitry 530 which is configured to implement communications with remote device 510 via link 520 including outputting information regarding the monitored air pressures to remote device 510. Communication circuitry 530 may be arranged to communicate information bi-directionally with respect to remote device 510, for example receiving user inputs for controlling apparatus 10 from remote device 510 (e.g., changing a threshold of air pressure being monitored). Communication circuitry 530 and remote device 510 include appropriate circuitry to implement wireless communications, such as Bluetooth or WiFi, or wired transmissions via link 520.

Some components of apparatus 10 may be omitted when implemented in system 500, such as a display and alarm, since remote device 510 is configured to generate and output user perceptible emissions regarding the monitored air pressures In other embodiments, both apparatus 10 and remote device 510 are configured to simultaneously generate and output user perceptible emissions.

Various illustrative embodiments of the disclosure above include different configurations of attachment mechanisms for attaching the pressure gauge apparatus to different inflatable devices or valve assemblies. In some embodiments, the attachment mechanism is implemented as part of the housing of pressure gauge apparatus (e.g., the embodiments of FIGS. 5 and 8). The attachment mechanism may also include different components in other embodiments (e.g., nut 151 in the embodiment of FIG. 10).

Aspects of the disclosure have been described above with respect to monitoring pressures of watercraft in accordance with example embodiments. The apparatus may also be configured to monitor air pressures within air chambers of other inflatable devices and be advantageously used in other applications to provide accurate pressure monitoring where the ambient pressure may change due to changes in elevation of the device. For example, the apparatuses described herein may be utilized to monitor the pressures of other inflatable, such as recreational water devices, bicycle tires/tubes, automotive tires, etc.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An inflatable device pressure gauge apparatus comprising:
   a housing;
   an attachment mechanism configured to attach the pressure gauge apparatus to an inflatable device which comprises an air chamber which is configured to be inflated to an increased pressure above atmospheric pressure during use of the inflatable device;
   a pressure sensor coupled with the housing and configured to sense pressurized air from the air chamber of the inflatable device and to output a signal corresponding to an air pressure of the air chamber;

a processor coupled with the housing and configured to process the signal from the pressure sensor and to control generation of a user perceptible emission regarding the air pressure of the air chamber as a result of the processing of the signal;

a power source coupled with the housing and configured to provide electrical energy to the processor; and wherein the pressure sensor is further configured to sense atmospheric air and to use the sensed atmospheric air to generate the signal corresponding to the air pressure of the air chamber; and wherein the housing is configured to define:
an air passage in fluid communication with a first port of the pressure sensor and the air chamber of the inflatable device; and
an internal volume in fluid communication with the atmospheric air and a second port of the pressure sensor.

2. The apparatus of claim 1 wherein the pressure sensor, the processor and the power source are provided within the internal volume.

3. The apparatus of claim 2 wherein the internal volume is watertight.

4. The apparatus of claim 1 further comprising a display, and wherein the processor is configured to control the display to output the user perceptible emission in the form of graphical information regarding the air pressure of the air chamber.

5. The apparatus of claim 1 further comprising alarm circuitry, and wherein the processor is configured to control the alarm circuitry to output the user perceptible emission in the form of an audible alarm as a result of the air pressure of the air chamber triggering at least one threshold.

6. An inflatable device pressure gauge apparatus comprising:
a housing;
an attachment mechanism configured to attach the pressure gauge apparatus to an inflatable device which comprises an air chamber which is configured to be inflated to an increased pressure above atmospheric pressure during use of the inflatable device;
a pressure sensor coupled with the housing and configured to sense pressurized air from the air chamber of the inflatable device and to output a signal corresponding to an air pressure of the air chamber;
a processor coupled with the housing and configured to process the signal from the pressure sensor and to control generation of a user perceptible emission regarding the air pressure of the air chamber as a result of the processing of the signal;
a power source coupled with the housing and configured to provide electrical energy to the processor;
wherein the inflatable device comprises a valve assembly configured to selectively permit flow of the pressurized air with respect to the air chamber, and wherein the attachment mechanism is configured to be attached to a valve port body of the valve assembly; and
wherein the inflatable device is a watercraft.

7. The apparatus of claim 6 wherein the attachment mechanism comprises threads configured to mate with threads of the valve body.

8. The apparatus of claim 6 wherein the attachment mechanism comprises a lock member configured to mate with a lock member of the inflatable device.

9. The apparatus of claim 6 wherein the housing is configured to provide the valve assembly in an open configuration to permit the flow of the pressurized air to the pressure sensor during sensing of the pressurized air by the pressure sensor.

10. The apparatus of claim 6 wherein the attachment mechanism is configured to attach the pressure gauge apparatus to a wall of the inflatable device.

11. An inflatable device pressure gauge apparatus comprising:
a housing;
an attachment mechanism configured to attach the pressure gauge apparatus to an inflatable device which comprises an air chamber which is configured to be inflated to an increased pressure above atmospheric pressure during use of the inflatable device;
a pressure sensor coupled with the housing and configured to sense pressurized air from the air chamber of the inflatable device and to output a signal corresponding to an air pressure of the air chamber;
a processor coupled with the housing and configured to process the signal from the pressure sensor and to control generation of a user perceptible emission regarding the air pressure of the air chamber as a result of the processing of the signal;
a power source coupled with the housing and configured to provide electrical energy to the processor; and
wherein the attachment mechanism comprises:
an extension from the housing which is configured to pass through an orifice in a wall of the inflatable device; and
a nut configured to be coupled with the extension, and wherein the attachment mechanism is configured to form a seal with respect to the wall of the inflatable device; and
wherein the inflatable device is a watercraft.

12. An inflatable device pressure gauge apparatus comprising:
a housing;
an attachment mechanism configured to attach the pressure gauge apparatus to an inflatable device which comprises an air chamber which is configured to be inflated to an increased pressure above atmospheric pressure during use of the inflatable device;
a pressure sensor coupled with the housing and configured to sense pressurized air from the air chamber of the inflatable device and to output a signal corresponding to an air pressure of the air chamber;
a processor coupled with the housing and configured to process the signal from the pressure sensor and to control generation of a user perceptible emission regarding the air pressure of the air chamber as a result of the processing of the signal;
a power source coupled with the housing and configured to provide electrical energy to the processor; and
wherein the housing comprises an orifice, and further comprising a semipermeable membrane configured to cover the orifice and prevent water and debris from entering an internal volume defined by the housing and to pass air molecules of atmospheric air into the internal volume defined by the housing.

13. The apparatus of claim 12 wherein the semipermeable membrane is a first semipermeable membrane and the housing is configured to define an air passage from the air chamber of the inflatable device to the pressure sensor, and further comprising a second semipermeable membrane configured to prevent water and debris from passing through the air passage and pass air molecules of the pressurized air through the air passage to the pressure sensor.

14. The apparatus of claim 12 wherein the pressure sensor is within the internal volume and the orifice is a first orifice, and wherein the pressure sensor is configured to:
- receive the air molecules of the atmospheric air from the internal volume; and
- receive the pressurized air from a second orifice in the housing which is in fluid communication with the air chamber of the inflatable device.

15. The apparatus of claim 12 further comprising:
- a button adjacent to an exterior surface of the semipermeable membrane;
- a switch adjacent to an interior surface of the semipermeable membrane and configured to output another signal to the processor as a result of a user depressing the button; and
- wherein the processor is configured to change the user perceptible emission as a result of the outputted another signal from the switch.

16. An inflatable device pressure gauge apparatus comprising:
- a housing;
- an attachment mechanism configured to attach the pressure gauge apparatus to an inflatable device which comprises an air chamber which is configured to be inflated to an increased pressure above atmospheric pressure during use of the inflatable device;
- a pressure sensor coupled with the housing and configured to sense pressurized air from the air chamber of the inflatable device and to output a signal corresponding to an air pressure of the air chamber;
- a processor coupled with the housing and configured to process the signal from the pressure sensor and to control generation of a user perceptible emission regarding the air pressure of the air chamber as a result of the processing of the signal;
- a power source coupled with the housing and configured to provide electrical energy to the processor; and
- wherein the housing comprises an extended portion which is configured to be inserted into a valve port body of a valve assembly of the inflatable device, and further comprising first and second seal members configured to form respective first and second seals with the valve port body upon insertion of the extended portion of the housing into the valve port body, and wherein the first seal member is configured to form the first seal prior to the formation of the second seal by the second seal member during the insertion of the extended portion of the housing into the valve port body.

17. An inflatable device pressure gauge apparatus comprising:
- a housing;
- an attachment mechanism configured to attach the pressure gauge apparatus to an inflatable device which comprises an air chamber which is configured to be inflated to an increased pressure above atmospheric pressure during use of the inflatable device;
- a pressure sensor coupled with the housing and configured to sense pressurized air from the air chamber of the inflatable device and to output a signal corresponding to an air pressure of the air chamber;
- a processor coupled with the housing and configured to process the signal from the pressure sensor and to control generation of a user perceptible emission regarding the air pressure of the air chamber as a result of the processing of the signal;
- a power source coupled with the housing and configured to provide electrical energy to the processor; and
- wherein the housing comprises an extended portion which is configured to be inserted into the valve port body of a valve assembly of the inflatable device and to provide the valve assembly in an open configuration during insertion of the extended portion of the housing into the valve port body.

18. The apparatus of claim 17 further comprising a seal member configured to form a seal with the valve port body during the insertion and prior to the provision of the valve assembly in the open configuration.

* * * * *

UNITED STATES PATENT AND TRADEMARK OFFICE
CERTIFICATE OF CORRECTION

PATENT NO. : 11,112,327 B2
APPLICATION NO. : 16/235133
DATED : September 7, 2021
INVENTOR(S) : Erik J. Cegnar and Michael R. Maughan Page 1 of 1

It is certified that error appears in the above-identified patent and that said Letters Patent is hereby corrected as shown below:

On the Title Page

(56) References Cited, page 2, 2nd Column, 48th Line:
Replace "Maughan et al., U.S. Appl. No. 29/643,695, filed Apr. 11, 2016,"
With --Maughan et al., U.S. Appl. No. 29/643,695, filed Apr. 11, 2018,--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*